(12) United States Patent
Kelly et al.

(10) Patent No.: US 6,558,246 B2
(45) Date of Patent: May 6, 2003

(54) HINGELESS VENTILATOR

(75) Inventors: Timothy A. Kelly, Salem, VA (US); Randy L. Pratt, Salem, VA (US)

(73) Assignee: Salem Vent International, Inc., Salem, VA (US)

( * ) Notice: Subject to any disclaimer, the term of this patent is extended or adjusted under 35 U.S.C. 154(b) by 0 days.

(21) Appl. No.: 09/971,045

(22) Filed: Oct. 4, 2001

(65) Prior Publication Data

US 2003/0068970 A1 Apr. 10, 2003

(51) Int. Cl.[7] .................................................. B60H 1/00
(52) U.S. Cl. .......................... 454/145; 454/151; 454/164
(58) Field of Search ............................ 454/145, 76, 81, 454/84, 95, 138, 143, 162, 164, 225, 333, 151

(56) References Cited

U.S. PATENT DOCUMENTS

| | | | |
|---|---|---|---|
| 3,046,865 A | | 7/1962 | Kelly |
| 3,102,464 A | * | 9/1963 | Kelly et al. .................. 454/145 |
| 3,358,576 A | * | 12/1967 | Kelly et al. .................... 160/92 |
| 3,375,772 A | * | 4/1968 | Kelly et al. .................. 454/143 |
| 3,760,707 A | | 9/1973 | Kelly |
| 3,839,950 A | * | 10/1974 | Kelly et al. .................. 454/145 |
| 4,452,129 A | * | 6/1984 | Kelley et al. .................. 16/231 |
| 4,519,645 A | | 5/1985 | Kelly et al. |
| 4,522,115 A | | 6/1985 | Kelly et al. |
| 4,938,122 A | | 7/1990 | Ziemba |
| 5,020,425 A | * | 6/1991 | Kelly .......................... 454/143 |
| 5,766,068 A | * | 6/1998 | Kelly .......................... 454/145 |
| 6,126,538 A | * | 10/2000 | Kelly et al. .................. 454/143 |
| 6,280,315 B1 | * | 8/2001 | Kelly .......................... 454/145 |
| 6,478,670 B2 | | 11/2002 | Kelly |

* cited by examiner

Primary Examiner—Harold Joyce
(74) Attorney, Agent, or Firm—Dority & Manning

(57) ABSTRACT

A two-way hingeless ventilator for ventilating an enclosure through a wall thereof has a frame defining an opening therethrough. A closure member is disposed against an outer side of the frame and is alternately swingable relative to the frame between open and closed positions at opposite sides of the opening. A tensioning rod is fixed on the frame and extends between opposite sides of the opening. An actuating member extends from an inner side of the closure member through the opening and intermediate ends of the tensioning rod. A positioning slot is defined in the actuating member through which the tensioning rod passes in a tensioned condition to apply a closing force to the closure member. The positioning slot has a central position defining a closed position of the cover member and opposite side slots extending away from the central position. The closure member is variably movable from the closed position to oppositely facing open positions by rotation or pivoting of the actuating member which causes the tensioning rod to variably engage along either of the side slots in its tensioned condition. An assist member is configured with the actuating member to add a mechanical advantage to the opening and closing operation.

18 Claims, 5 Drawing Sheets

HINGELESS VENTILATOR

BACKGROUND OF THE INVENTION

The present invention relates to a hingeless ventilator for ventilating a compartment or enclosure through a defining wall thereof. Hingeless ventilators are well known in the art and there are a number of Kelly and Kelly et al. patents on hingeless ventilators particularly designed for ventilating a cab or other compartment of a vehicle. Among these patents are U.S. Pat. Nos. 3,102,464; 3,358,576; 3,375,772; 3,839,950; 4,452,129; 5,020,425; and 5,766,068.

U.S. Pat. No. 3,375,772 to Kelly et al. describes a "one-way" hingeless ventilator having a cover member that is swingable in an arc in one direction between open and closed positions. The device described in the '772 patent includes a tension rod mounted on a frame for holding the cover member in position. The cover has a guide secured to an inner face thereof having a guide way which is slidably engaged with the tension rod.

The present invention relates to an improvement on a type of hingeless ventilator utilizing a tensioning rod passing through a slot on the actuator, and particularly to an improvement of the actuating member.

OBJECTS AND SUMMARY OF THE INVENTION

It is therefore a principal object of the present invention to provide an improved hingeless ventilator, particularly a hingeless ventilator having an improved actuating device.

Additional objects and advantages of the invention will be set forth in part in the following description, or may be obvious from the description, or may be learned through practice of the invention.

U.S. Pat. No. 6,280,315 B1 issued on Aug. 28, 2001, to Kelly describes a two-way hingeless ventilator having a tensioning rod fixed to the frame. The rod extends through a generally V-shaped slot in an actuating member that extends from the inner side of the closure member to exert a closing force to the closure member. The closure member is variably movable from the closed position to an open position by rotation or pivoting of the actuating member which causes the tensioning rod to engage along either side of the V-shaped slot. The present invention relates to an improvement that is particularly useful on the type of hingeless ventilator described in the '315 patent to Kelly. Accordingly, U.S. Pat. No. 6,280,315 B1 is incorporated herein in its entirety for all purposes.

In accordance with the objects and purposes of the invention, a hingeless ventilator is provided for ventilating an enclosure through a wall thereof. The hingeless ventilator according to the invention is not particularly limited in its field of use, and may be used wherever it is desired to ventilate a compartment or space.

The hingeless ventilator includes a frame defining a central opening therethrough. Preferably, a perforated plate or screen member is disposed across the central opening. The perforated plate or screen member may be formed integral with the frame.

A closure member is disposed against an outer side of the frame to seal the central opening in a closed position. The closure member is swingable relative to the frame between open and closed positions. In one embodiment of the invention, the ventilator is a "two-way" ventilator and the closure member is positionable to alternate (oppositely oriented) open positions. The closure member has a shape, for example as defined by flanges, so as to align and seal against complimenting portions of the frame member. The closure member may include a unitary bracket with a cover member attached thereto.

A tensioning or spring rod is fixed or attached to the frame and extends between opposite sides of the central opening. In a preferred embodiment, the central opening has a generally rectangular shape and the tensioning rod is fixed to the frame across the longer aspect of the rectangular opening.

An actuating member extends from an inner side of the closure member through the central opening in the frame and is located between the ends of the tensioning rod. In a preferred embodiment, the actuating member is centered longitudinally relative to the tensioning rod. The actuating member may comprise any configuration and, in a preferred embodiment, is a plate member extending from the inner side of the closure member. For example, in the embodiment wherein the closure member includes a unitary bracket, the actuating member may comprise a plate formed integral with the bracket and bent at a right angle relative thereto. In an alternative embodiment, the actuating member may comprise a plate that is welded or otherwise attached to the closure member. The actuating member extends in a plane that is substantially perpendicular to the longitudinal axis of the tensioning rod.

The tensioning rod passes through a positioning slot defined in the actuating member. The positioning slot is defined so that the tensioning rod is maintained in a constant state of tension to apply a closing force to the closure member. In one embodiment, the positioning slot comprises a shape so that the closure member can be pivoted or moved to an open position in either direction relative to the longitudinal axis of the frame to give the closure member its "two-way" operation. In this embodiment, the positioning slot comprises a central position defining the closed position of the cover member, and opposite side slots that extend away from, for example at an angle or arc, from the central position. The closure member is variably movable from the closed position to oppositely facing open positions by movement of the actuating member that causes relative sliding movement between the tensioning rod and either of the side slots. In a preferred embodiment, the positioning slot has a generally V-shape with the closed position being defined at the apex of the V-shape.

It should also be appreciated that the present invention encompasses an embodiment having a single side slot extending from the closed position. Such an embodiment would be considered a "one-way" ventilator because it can only open in one direction.

The actuating member includes an assist member configured therewith to aid in moving the actuating member off of the closed position and along the length of the positioning slot relative to the tensioning rod. For example, it may be preferred to incorporate a recess or scalloped portion in the actuating member slot to hold the tensioning rod in the central or closed position. However, in order to move the actuating member relative to the tensioning rod to open the ventilator, some degree of effort must be exerted by the operator to disengage the tensioning rod from the central or closed position and along the positioning slot. The assist member aids in this regard. The assist member adds a mechanical advantage without significantly increasing the length of the actuating member. The mechanical advantage could be increased by lengthening the actuating member to increase the moment force. However, the inventive ventilator is typically used in compartments where space is a critical concern, such as a truck cab. It is not desirable to have the actuating member extend any more than is necessary into the compartment space.

In one embodiment, the assist member is an elongated member pivotally attached to the actuating member at a location above the central or closed position in the positioning slot. A top portion of the assist member is manually grasped by the operator and, in this regard, may include a handle or like device for easy grasping and manipulation by the operator. The assist member further may include an elongated guide channel extending downwardly from the pivot point to a location adjacent the tensioning rod at the closed position of the positioning slot. The tensioning rod passes through the guide channel. In operation, the operator manually grasps the top portion of the assist member, for example by way of a handle provided on the assist member, and pivots (pushes) the assist member in a direction so that a side of the guide channel engages and pushes against the tensioning rod. This action causes the tensioning rod to disengage from the closed position in the positioning slot. Further movement of the assist member by the operator causes the relative movement between the tensioning rod and actuating member along the length of the positioning slot. The guide channel thus has a shape to accommodate the full range of relative movement between the rod and positioning slot.

It should be appreciated that the assist member and guide channel may take on any manner of structural configuration and shape while still providing the lever-like assist in opening the ventilator. In one particular embodiment, the guide channel is defined as a generally U-shaped opening defined between opposite extending leg members. This embodiment is useful when the positioning slot includes two side slots (a "two-way" ventilator) extending in generally opposite directions from a central closed position of the positioning slot. One leg member pushes against the tensioning rod in one pivotal direction of the assist member, and the opposite leg member pushes against the tensioning rod in the opposite pivotal direction of the assist member.

It may be preferred to utilize a friction reducing collar or similar device around the tensioning rod at the location where the rod passes through the positioning slot. In this embodiment, the leg members or other structure defining the guide channel in the assist member may engage against the collar.

The actuating member also includes a handle member or operating mechanism attached thereto so that an operator can easily operate the ventilator manually or by way of a power or driven assist.

Other features of the present two-way hingeless ventilator will be described in greater detail below through use of the appended figures.

DETAILED DESCRIPTION

Figure 1:
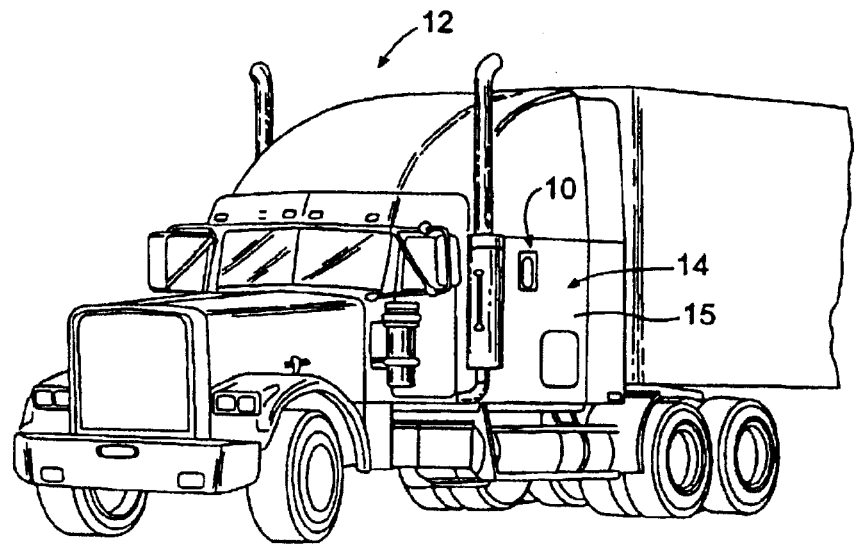
FIG. 1 is a perspective view of a two-way hingeless ventilator according to the invention used as a ventilator for a truck compartment.
Figure 2:
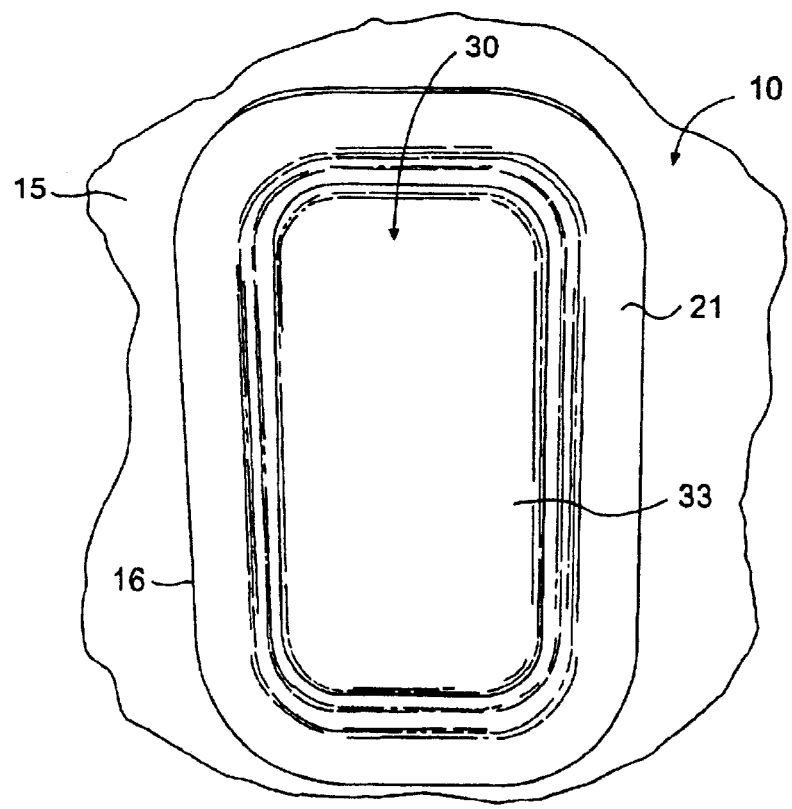
FIG. 2 is a front perspective view of the ventilator unit according to the invention.
Figure 3:
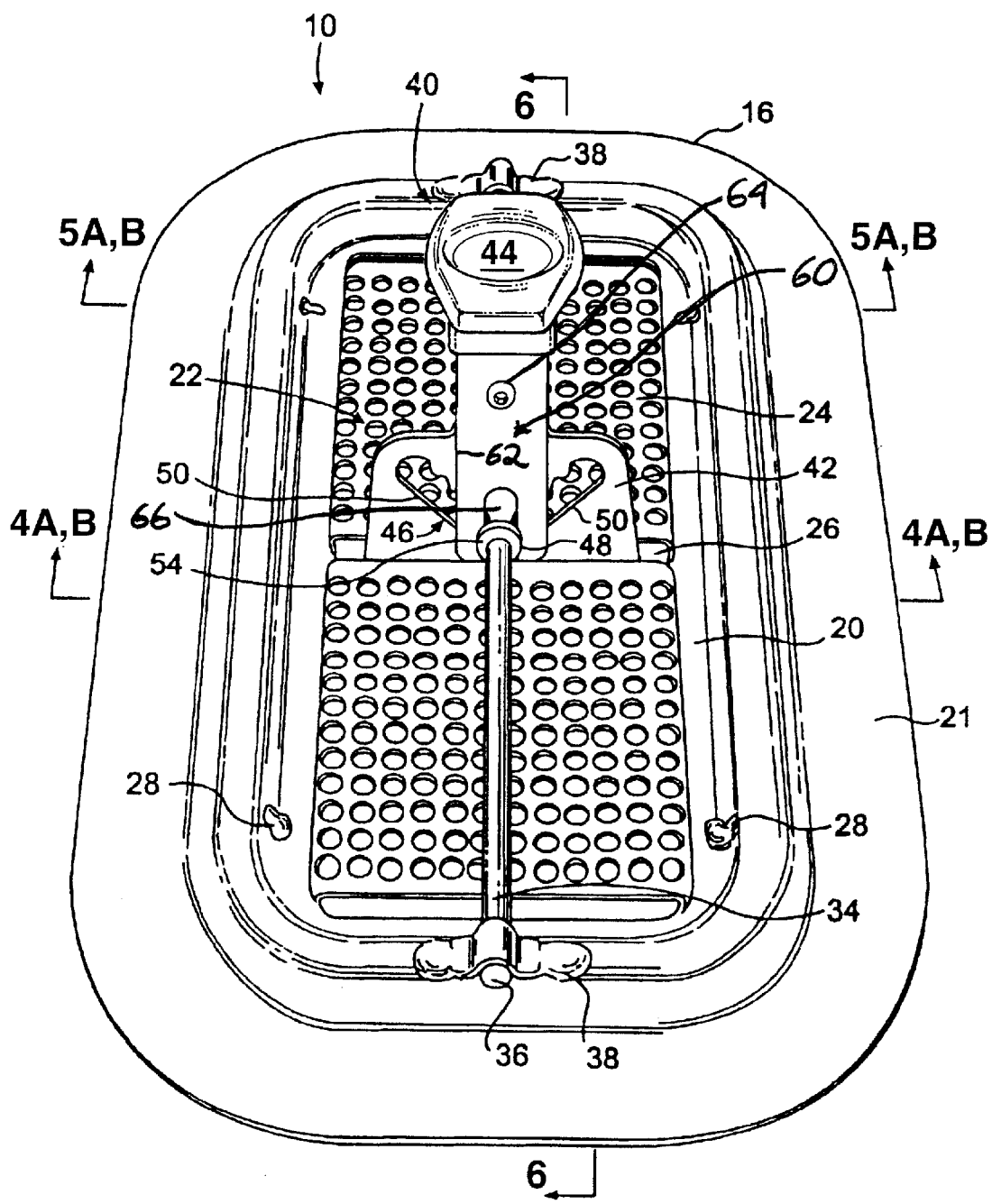
FIG. 3 is a perspective back view of the ventilator according to the invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present application include such modifications and variations.

U.S. Pat. No. 6,280,315 B1 is incorporated herein in its entirety for all purposes.

Two-way hingeless ventilators of the present type are well understood by those skilled in the art and the operation thereof is described in detail in various U.S. patents, particularly U.S. Pat. No. 5,766,068; U.S. Pat. No. 3,839,950; U.S. Pat. No. 4,452,129; and U.S. Pat. No. 5,020,425, the disclosures of which are incorporated herein in their entirety for all purposes. Thus, it is not essential for purposes of the present description to provide a detailed explanation of the hingeless ventilator features common to the prior art and described in the cited patents. Such features will be described generally to the extent necessary to provide a complete understanding of the present invention.

The hingeless ventilator 10 according to the invention is illustrated generally in FIG. 1 as a ventilator used to ventilate a compartment 14 of truck 12. Ventilator 10 is disposed through a defining wall 15 of compartment 14. It should be appreciated, however, that the field of use of ventilator 10 is not limited to vehicle compartments or cabs. Ventilator 10 may be used in any environment wherein it is desired to ventilate an enclosed space, compartment, or the like.

Hingeless ventilator 10 according to the invention includes a frame, generally 16, configured for attachment to wall 15. Frame 16 may take on any number of structural configurations. For example, frame 16 may include a circumferential flange 21 that defines a central opening 22 therethrough for passing air through ventilator 10 into or out of compartment 14. Opening 22 may be defined by any suitable structure, for example flange 20 of frame 16. A member having air passages defined therethrough, preferably a perforated plate or screen member 24, covers opening 22. Perforated plate 24 may be connected to frame 16 in any manner, or may be formed integral therewith.

Figure 4A:
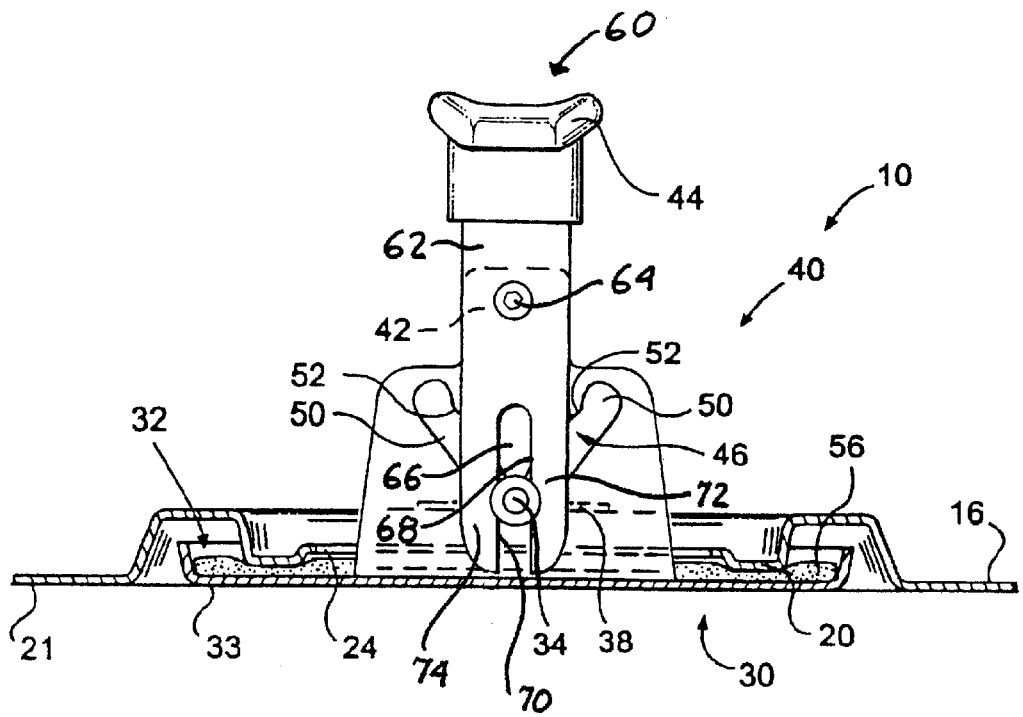
FIG. 4a is a cross-sectional view of the ventilator taken along the lines indicated in FIG. 3.
Figure 4B:
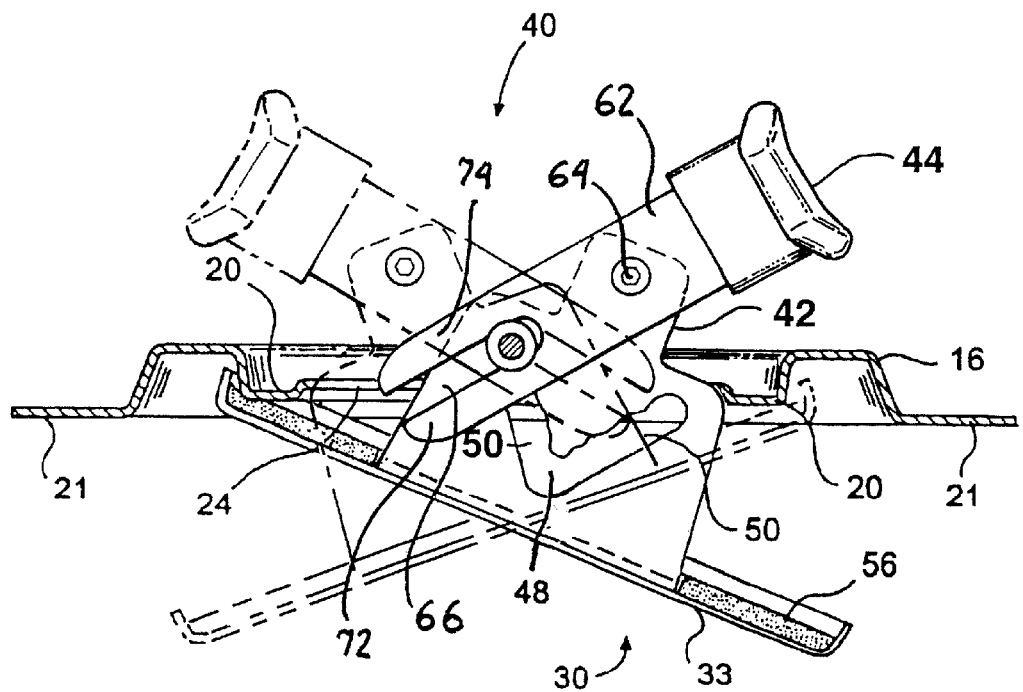
FIG. 4b is a cross-sectional operational view of the ventilator taken along the lines indicated in FIG. 3.
Figure 5A:
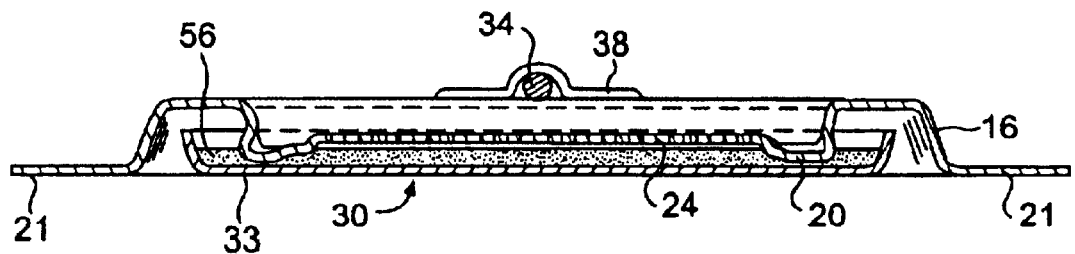
FIG. 5a is a cross-sectional view of the ventilator taken along the lines indicated in FIG. 3.
Figure 5B:
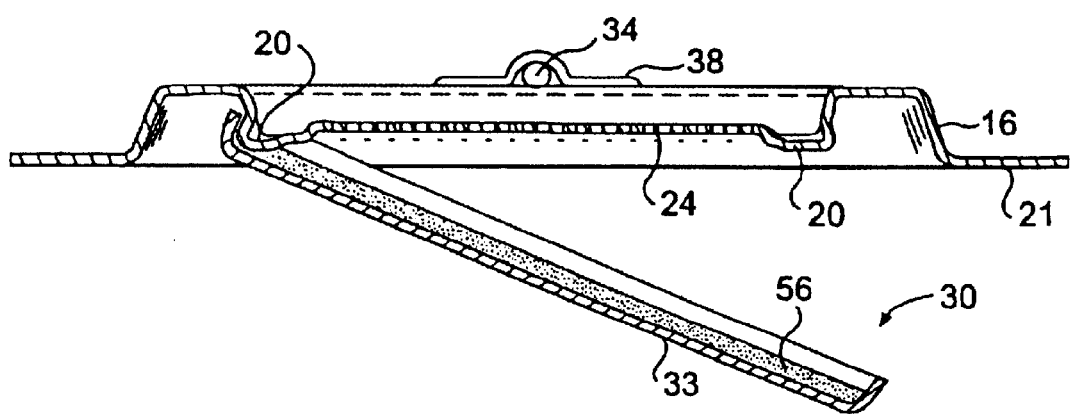
FIG. 5b is a cross-sectional operational view of the ventilator taken along the lines indicated in FIG. 3.

A closure member, generally 30, is provided and is swingable against an outer side of frame 16 for opening and closing central opening 22. In the illustrated embodiment, closure member 30 is openable in one direction so as to force air into the respective compartment, and openable in the opposite direction to draw air out of the compartment. This "two-way" operation of closure member 30 is illustrated in FIG. 4b. It should be appreciated that the invention also encompasses a "one-way" ventilator wherein the closure member 30 opens in only one direction, such as illustrated and described in U.S. Pat. No. 3,375,772 incorporated herein in its entirety for all purposes.

Closure member 30 includes a cover member 33 that may be formed by a plate material or member, or molded from a plastic material. A gasketing material 56 is disposed on an inner side 32 of closure member 30 for aiding in sealing engagement between closure member 30 and flange 20 of frame member 16. Closure member 30 is "centered" relative to flange 20 and opening 22 by alignment nubs 28 formed on flange 20. In an alternative embodiment, closure member 30 may be formed in accordance with U.S. Pat. No. 5,766,068, the entire disclosure of which is incorporated herein in its entirety for all purposes. In the '068 patent, the closure member is formed by a unitary plate or bracket having an aesthetic cover member attached thereto.

Ventilator 10 also includes a tensioning rod 34 having ends 36 fixed to frame 16 between opposite sides of opening 22. As illustrated in the figures, tensioning rod 34 is preferably disposed longitudinally relative to the longer or lengthwise aspect of opening 22 and centered relative to the opening. Tensioning rod 34 may be held to frame 16 by any conventional manner, such as brackets 38 illustrated in the figures. Tensioning rod 34 is in a constant tensioned state regardless of the position of closure member 30 so as to apply a constant closing force to the closure member, as will be described in greater detail below.

Ventilator 10 also includes an actuating member, generally 40, extending from an inner side of closure member 30 through an opening or slot 26 defined through perforated plate 24. In the embodiment wherein closure member 30 includes a unitary bracket as described in the cited '068 patent, actuating member 40 may include a section of the unitary bracket bent at a right angle relative to closure member 30. In an alternative embodiment illustrated in the figures, actuating member 40 may be defined by a plate member 42 welded or otherwise attached to closure member 30. It should be appreciated that actuating member 40 can comprise any manner of configuration, shape, material, and the like.

Figure 6:
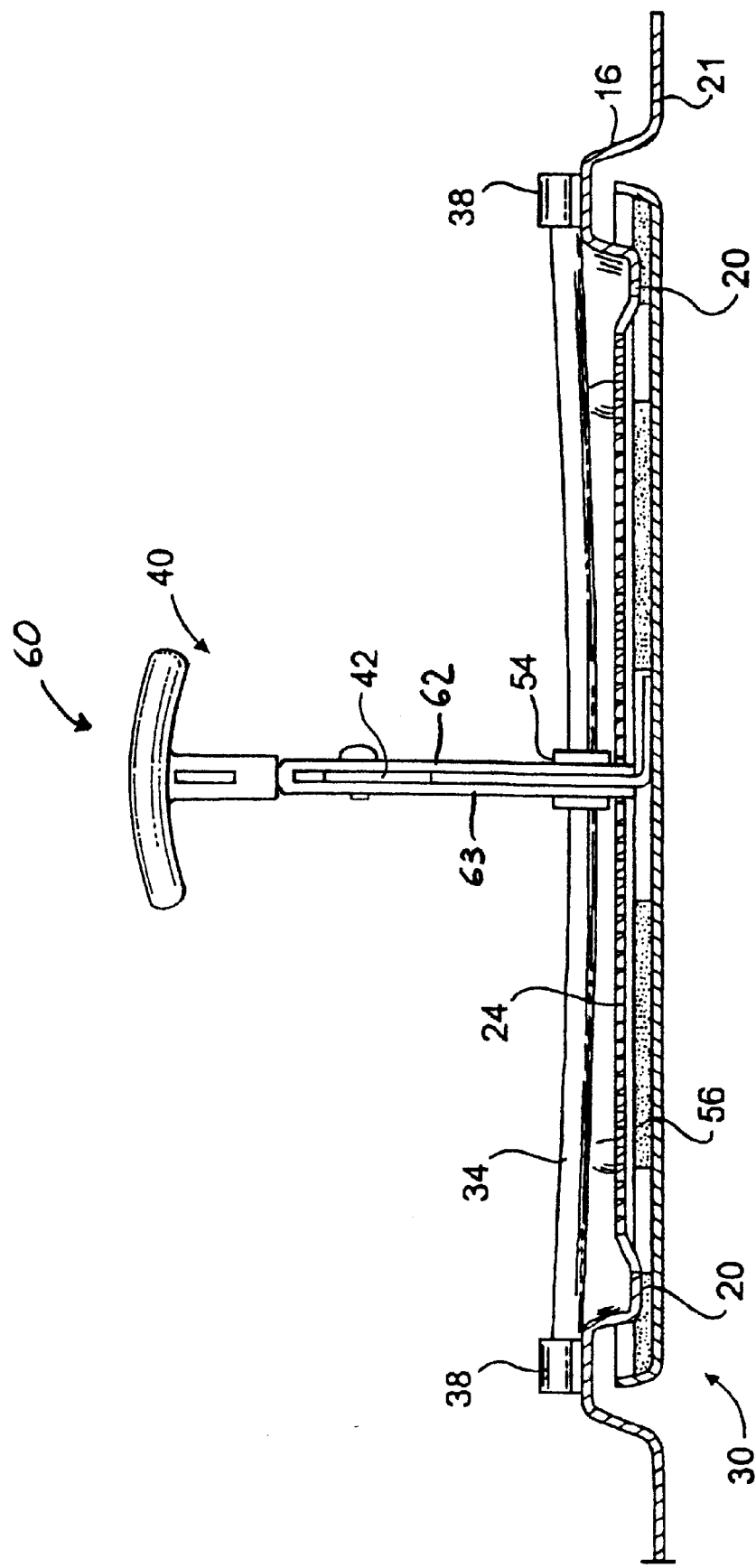
FIG. 6 is a cross-sectional view of the ventilator taken along the lines indicated in FIG. 3.

Actuating member 40 includes a positioning slot, generally 46, defined therethrough. Tensioning rod 34 passes through this positioning slot in a tensioned condition so as to apply a force to hold closure member 30 against frame 16, as particularly illustrated in FIG. 6.

Positioning slot 46 is disposed in a plane of actuating member 40, for example through plate 42, so as to be oriented substantially perpendicular to a longitudinal axis of tensioning rod 34. Positioning slot 46 has a shape so that the closure member can be moved to an open position in either direction (for a "two-way" ventilator) relative to the longitudinal axis of tensioning rod 34, as illustrated in FIG. 4b. In the embodiment illustrated in the figures, positioning slot 46 includes a central position 48 (best seen in FIG. 4b) defined at the apex of a generally V-shaped slot 46. Central position 48 engaged by tensioning rod 34 defines the closed position of closure member 30, as illustrated in FIG. 4a. Opposite side slots 50 extend at an angle from central position 48. Side slots 50 define the opposite open positions of closure member 30, as illustrated in FIG. 4b.

Regardless of the relative position of tensioning rod 34 along either of side slots 50, the tensioning rod applies a continuous force to closure member 30 relative to frame 16. In this manner, closure member 30 is variably positionable relative to frame 16 yet is held against frame 16 so as not to rattle or vibrate. When actuating member 40 is moved to the closed position of FIG. 4a, a normal closing force is applied to closure member 30 causing closure member to seal against flange 20 of frame 16.

Preferably, a friction reducing device, such as a roller or collar 54, is configured with tensioning rod 34 where the rod passes through actuating member 40.

The actuating member 40 incorporates an assist member, generally 60. The assist member 60 is intended to add a mechanical advantage for opening and closing the closure member 30 without significantly increasing the depth or length of actuating member 40. In this regard, it should be appreciated that a number of different structures could be configured with actuating member 40 for this purpose. The embodiment of an assist member 60 illustrated in the figures is but one type of assist member within the scope and spirit of the invention.

Referring to FIGS. 3, 4A, 4B, and 6, the embodiment of the assist member 60 includes an elongated member 62 that is attached to plate member 42 at a pivot point 64. Member 62 may be a bar, rod, etc. In the illustrated embodiment, member 62 is a plate member. Any conventional mechanical pivot connection may be used to attach member 62 to the plate member 42. Member 62 may be a single plate attached against one side of plate member 42, or it may include an additional opposite plate 63 (FIG. 6) so that plate member 42 is essentially sandwiched between plates 62, 63. The pivot connection 64 allows the member 62 to swing or pivot relative to the actuating plate member 42, as in particularly seen in the operational view of FIG. 4B.

The member 62 defines a guide channel 66 through which the tension rod 34 passes. This guide channel is defined below the pivot connection 64 in a lower portion of member 62 and may be defined by any suitable structure, for example a first leg 72 and a second leg 74. The guide channel 66 includes a first 68 and a second side 70, for example defined by the legs 72, 74. These sides are disposed on opposite sides of and in contact against tension rod 34 or collar 54. Guide channel 66 has a shape and a length so as to accommodate movement between tensioning rod 34 and positioning slot 46 along the length of the side slots 50. In the illustrated embodiment, the guide channel 66 is defined as a generally U-shaped channel.

A handle 44 may be provided at the top of the member 62 to aid an operator in grasping and manipulating the assist member and actuating member.

Operation of the opening and closing operation is illustrated particularly in FIG. 4b. In order to open closure member 30 in either direction, an "operator" (manual or powered mechanism) moves the assist member in one direction by grasping and pushing or pulling the handle 44 attached to the elongated member 62. This action causes the member 62 to pivot relative to the actuating plate member 42. A respective side 68, 70 of the channel 66 pushes against the tension rod 34 to disengage the rod from the central or closed position 48 in slot 46. Further movement of the assist member 62 urges the plate member 42 to slide relative to the tension rod 34 along the length of the respective side slot 50 until the closure member 30 is in its fully open position. To open the closure member 30 in the opposite direction, the operator simply moves the assist member 62 in the opposite direction from the closed position, as can be seen in dashed lines in FIG. 4B.

To close the closure member 30, the operator moves the assist member 62 opposite to the opening direction until the tension rod 34 engages into the central or closed position 48 of the positioning slot 46.

Side slots 50 may have variable positioning recesses or divots 52 defined therealong so that closure member 30 can be held in variable open positions defined along side slots 50.

It should be appreciated by those skilled in the art that various modifications and variations can be made in the present invention without departing from the scope and spirit of the invention. For example, positioning slot 46 may be defined in any suitable shape that allows for opening of the closure member along opposite sides. Positioning slot 46 may, for example, have a step-wise shape, divots, detents, etc. in this regard. It should also be appreciated that the invention is not limited to the particular types of materials used for the components thereof. It should also be appreciated that the ventilator according to the invention is not limited in its overall shape or configuration, although a rectangular shape is preferred.

It is intended that the present invention include such modifications and variations as come within the scope of the appended claims and their equivalents.

What is claimed is:

1. A hingeless ventilator for ventilating an enclosure through a wall thereof, comprising:
    a frame, said frame defining an opening therethrough;
    a closure member disposed against an outer side of said frame and swingable relative to said frame between open and closed positions;
    a stationary tensioning rod fixed on said frame and extending between opposite sides of said opening;
    an actuating member extending from an inner side of said closure member through said opening and intermediate ends of said tensioning rod;
    a positioning slot defined in said actuating member through which said tensioning rod passes in a tensioned condition to apply a closing force to said closure member, said positioning slot comprising a closed position of said closure member, and at least one opposite side slot extending away from said closed position, said closure member variably movable relative to said stationary tensioning rod from said closed position to an open position along said side slot by movement of said actuating member;
    an assist member pivotally attached to said actuating member at a pivot point location above said closed position in said positioning slot, said assist member having a guide channel defined in a lower portion thereof below said pivot point, said tensioning rod passing through said guide channel, said guide channel having a shape so as to accommodate relative movement between said tensioning rod and said positioning slot along the length of said positioning slot;
    wherein to open said ventilator an operator pivots said assist member relative to said actuating member so that a side of said guide channel pushes against said tensioning rod and assists in disengaging said tensioning rod from said closed position.

2. The ventilator as in claim 1, wherein said positioning slot comprising two said side slots, said closed position being a central position and said side slots extending away from said central position in generally opposite directions, said actuating member movable relative to said tensioning rod along the direction of either of said side slots so that said closure member is swingable in opposite directions to an open position in either direction, said assist member pivotal in opposite directions to assist in disengaging said tensioning rod from said closed position in either direction.

3. The ventilator as in claim 2, wherein said guide channel comprises a generally U-shaped opening defined by downwardly extending leg members, said tensioning rod passing through said U-shaped opening.

4. The ventilator as in claim 2, wherein said positioning slot comprises a generally V-shaped slot.

5. The ventilator as in claim 1, further comprising a plurality of open positions defined along said side slot.

6. The ventilator as in claim 1, further comprising a friction reducing device configured on said tensioning rod where said tensioning rod passes through said actuating member, sides of said guide channel engaging against said friction reducing device upon opening and closing said ventilator.

7. The ventilator as in claim 1, further comprising a plate member extending across said opening, said plate member having a plurality of air passages defined therethrough, said actuating member extending through said plate member.

8. The ventilator as in claim 7, wherein said plate member is formed as an integral component with said frame.

9. The ventilator as in claim 1, wherein said assist member further comprises a handle disposed to aid an operator in manually positioning said actuating member.

10. The ventilator as in claim 1, wherein said actuating member is a plate member and extends at an essentially right angle relative to said closure member.

11. The ventilator as in claim 1, further comprising a sealing gasket material attached to an underside of said closure member for sealing engagement with said frame member in said closed position of said closure member.

12. A two-way hingeless ventilator for ventilating an enclosure through a wall thereof, comprising:
    a frame, said frame defining an opening therethrough;
    a closure member disposed against an outer side of said frame and alternately swingable relative to said frame between open and closed positions at opposite sides of said opening;
    a tensioning rod fixed on said frame and extending between opposite sides of said opening;
    an actuating member extending from an inner side of said closure member through said opening and intermediate ends of said tensioning rod;
    a positioning slot defined in said actuating member through which said tensioning rod passes in a tensioned condition to apply a closing force to said closure member, said positioning slot comprising a shape so that said closure member can be swung to an open position in either direction relative to a longitudinal axis of tensioning rod;
    an assist member pivotally attached to said actuating member and having opposite legs extending downwardly to a position adjacent said tensioning rod; and
    wherein upon an operator moving said assist member in a first direction, one of said legs pushes against said tensioning rod to assist in moving said actuating member relative to said tensioning rod in one direction along said positioning slot, and upon moving said assist member in the opposite direction, the opposite said leg pushes against said tensioning rod to move said actuating member in an opposite direction along said positioning slot.

13. The ventilator as in claim 12, wherein said positioning slot comprises a central position defining a closed position of said cover member, and opposite side slots extending away from said central position; and wherein said closure member is variably movable from said closed position to oppositely facing open positions by movement of said assist member in either pivotal direction causing relative movement between said tensioning rod and either of said side slots.

14. The ventilator as in claim 13, wherein said positioning slot is generally a V-shaped slot.

15. The ventilator as in claim 12, further comprising an operating handle connected to said actuating member.

16. The ventilator as in claim 12, wherein said actuating member comprises a plate disposed in a plane substantially perpendicular to a longitudinal axis of said tensioning rod, said positioning slot defined in said plate.

17. The ventilator as in claim 16, wherein said actuating member is substantially centered longitudinally relative to said tensioning rod.

18. A hingeless ventilator for ventilating an enclosure through a wall thereof, comprising:

a frame, said frame defining an opening therethrough;

a closure member disposed against an outer side of said frame and swingable relative to said frame between open and closed positions;

a stationary tensioning rod fixed on said frame and extending between opposite sides of said opening;

an actuating member extending from an inner side of said closure member through said opening and intermediate ends of said tensioning rod;

a positioning slot defined in said actuating member through which said tensioning rod passes in a tensioned condition to apply a closing force to said closure member, said positioning slot comprising a closed position of said closure member, and at least one opposite side slot extending away from said central position, said closure member variably movable relative to said stationary tensioning rod from said closed position to an open position along said side slot by movement of said actuator; an assist member pivotally attached to said actuating member at a pivot point location above said closed position in said positioning slot and engaged against said tensioning rod; and wherein to open said ventilator an operator contacts and pivots said assist member relative to said actuating member to assist in disengaging said tensioning rod from said closed position.

* * * * *